(12) United States Patent
Nishikawa

(10) Patent No.: US 10,171,366 B2
(45) Date of Patent: Jan. 1, 2019

(54) COMMUNICATION DEVICE AND CONTROL METHOD OF COMMUNICATION DEVICE

(71) Applicant: NEC Corporation, Minato-ku, Tokyo (JP)

(72) Inventor: Yoshiaki Nishikawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 244 days.

(21) Appl. No.: 14/916,656

(22) PCT Filed: Sep. 11, 2014

(86) PCT No.: PCT/JP2014/004677
§ 371 (c)(1),
(2) Date: Mar. 4, 2016

(87) PCT Pub. No.: WO2015/040833
PCT Pub. Date: Mar. 26, 2015

(65) Prior Publication Data
US 2016/0218984 A1    Jul. 28, 2016

(30) Foreign Application Priority Data

Sep. 19, 2013  (JP) .................................. 2013-194364

(51) Int. Cl.
| | | |
|---|---|---|
| *H04L 12/841* | (2013.01) | |
| *H04L 1/18* | (2006.01) | |
| *H04L 12/801* | (2013.01) | |

(52) U.S. Cl.
CPC ............ *H04L 47/283* (2013.01); *H04L 1/189* (2013.01); *H04L 1/1858* (2013.01);
(Continued)

(58) Field of Classification Search
CPC ... H04L 1/1607; H04L 1/1858; H04L 1/1874; H04L 1/1887; H04L 1/189; H04L 47/10; H04L 47/11; H04L 47/283; H04L 47/34
See application file for complete search history.

(56) References Cited

U.S. PATENT DOCUMENTS

| | | | | |
|---|---|---|---|---|
| 2006/0274748 A1* | 12/2006 | Nakashima | ........... | H04L 1/1835 370/389 |
| 2008/0137689 A1* | 6/2008 | Shiizaki | ................ | H04L 1/1887 370/498 |

(Continued)

FOREIGN PATENT DOCUMENTS

| | | |
|---|---|---|
| JP | S62-186636 A | 8/1987 |
| JP | S62-239737 A | 10/1987 |

(Continued)

OTHER PUBLICATIONS

International Search Report for PCT Application No. PCT/JP2014/004677, dated Nov. 4, 2014.

(Continued)

*Primary Examiner* — Jamal Javaid
*Assistant Examiner* — Rosene Clark

(57) ABSTRACT

In order to enable retransmission control without imposing heavy load on a transmitter/receiver device and a network, a communication device includes: a transmission data generation unit that outputs, as transmission data, communication data for which an increase in transmission delay is to be reduced; a retransmission confirmation data generation unit that outputs, after the transmission data is output, retransmission confirmation data a predetermined number of times at a first transmission interval; and a communication interface that assigns order information indicating a transmission order, to each of the transmission data and the retransmission confirmation data, and transmits, after the transmission data is transmitted, the retransmission confirmation data.

18 Claims, 7 Drawing Sheets

(52) U.S. Cl.
CPC ............ *H04L 1/1887* (2013.01); *H04L 47/11* (2013.01); *H04L 47/34* (2013.01)

(56) References Cited

U.S. PATENT DOCUMENTS

| | | | | |
|---|---|---|---|---|
| 2010/0322177 | A1* | 12/2010 | Luo | H04L 1/1825 370/329 |
| 2013/0100937 | A1* | 4/2013 | Fujita | H04L 1/1848 370/336 |
| 2015/0074483 | A1* | 3/2015 | Baduge | H04L 1/1816 714/749 |

FOREIGN PATENT DOCUMENTS

| | | |
|---|---|---|
| JP | 2008-199431 A | 8/2008 |
| JP | 2009-284163 A | 12/2009 |
| WO | 2007/007383 A1 | 1/2007 |
| WO | 2011/046056 A1 | 4/2011 |

OTHER PUBLICATIONS

English translation of Written opinion for PCT Application No. PCT/JP2014/004677.

\* cited by examiner

COMMUNICATION DEVICE AND CONTROL METHOD OF COMMUNICATION DEVICE

This application is a National Stage Entry of PCT/JP2014/004677 filed on Sep. 11, 2014, which claims priority from Japanese Patent Application 2013-194364 filed on Sep. 19, 2013, the contents of all of which are incorporated herein by reference, in their entirety.

TECHNICAL FIELD

The present invention relates to a communication device and a control method of a communication device, and relates particularly to a communication device including a configuration for reducing a time delay due to retransmission and a control method of the communication device.

BACKGROUND ART

When the number of data received in an incorrect order due to, for example, a loss of data, reaches a certain value or larger in a data communication network, the data receiving side instructs the data transmitting side to retransmit the data in some cases.

In the transmission control protocol (TCP), which is widely used in packet communications, high-speed retransfer is performed when it is found out, according to a duplicate acknowledgement, that the number of TCP segments received in an incorrect order is larger than or equal to a certain value. In high-speed retransfer in the TCP, a receiving side transmits, upon detection of a lack of a TCP segment, the same acknowledgement (ACK) three times in succession to a corresponding transmitting side. Upon receipt of such acknowledgements from the receiving side, the transmitting side retransmits the TCP segment on the basis of the sequence number included in the acknowledgement. The number of segments received in an incorrect order for the receiving side to instruct the transmitting side to retransmit the data varies depending on the operating system (OS) or settings of an employed receiver.

In retransmission control employed in the long term evolution (LTE), which is used in mobile communications, a receiving side reports a corresponding transmitting side about unreceived data when data larger than or equal to a certain amount is stored in a receiving buffer. The transmitting side that has received the report about the unreceived data from the receiving side retransmits the data.

As mentioned above, in general retransmission control, retransmission of data is performed after data larger than or equal to a certain amount is received in an incorrect order. For this reason, general retransmission control has a problem of having a large time delay in data transmission. As a technique for reducing a time delay in data transmission due to data retransmission, PTL 1 describes a transmission device configured to transmit transmission data and retransmission data that can recover the transmission data, and a receiving device capable of reducing a time delay by acquiring the transmission data from either the transmission data or the retransmission data. PTL 2 describes a relay device configured to cause the same transmission data to be transmitted multiple times irrespective of success or failure in transmission of transmission data.

CITATION LIST

Patent Literature

[PTL 1] WO 2007/007383 (Paragraphs [0067] and [0083])

[PTL 2] Japanese Unexamined Patent Application Publication No. 2008-199431 (Paragraph [0049])

SUMMARY OF INVENTION

Technical Problem

However, the techniques described in PTLs 1 and 2 have a problem of imposing heavy load on the transmitter/receiver device and the network due to transmission of retransmission data.

This is because, in the techniques described in PTLs 1 and 2, retransmission data is transmitted for all transmission data. In other words, in the techniques described in PTLs 1 and 2, retransmission control is performed also on data not having the problem of an increase in delay due to retransmission, so that unnecessary retransmission control increases the load imposed on the transmitter/receiver device and the network in some cases.

Object of Invention

The present invention aims to provide a communication device that enables retransmission control to be performed without imposing heavy load on a transmitter/receiver device and a network and a control method of the communication device.

Solution to Problem

A communication device of the present invention includes: a transmission data generation unit that outputs, as transmission data, communication data for which an increase in transmission delay is to be reduced; a retransmission confirmation data generation unit that outputs, after the transmission data is output, retransmission confirmation data a predetermined number of times at a first transmission interval; and a communication interface that assigns order information indicating a transmission order, to each of the transmission data and the retransmission confirmation data, and transmits, after the transmission data is transmitted, the retransmission confirmation data.

A control method of a communication device of the present invention includes the steps of: outputting, as transmission data, communication data for which an increase in transmission delay is to be reduced; outputting, after outputting the transmission data, retransmission confirmation data a predetermined number of times at a first transmission interval: and assigning order information indicating a transmission order, to each of the transmission data and the retransmission confirmation data, and transmitting the retransmission confirmation data after transmitting the transmission data.

A control program of a communication device of the present invention causes a computer of a communication device to carry out: a step of outputting, as transmission data, communication data for which an increase in transmission delay is to be reduced; a step of outputting, after outputting the transmission data, retransmission confirmation data a predetermined number of times at a first transmission interval; and a step of assigning order information indicating a transmission order, to each of the transmission data and the retransmission confirmation data, and transmitting the retransmission confirmation data after transmitting the transmission data.

Advantageous Effects of Invention

The communication device and the control method of a communication device according to the present invention enable retransmission control to be performed without imposing heavy load on a transmitter/receiver device and a network.

DESCRIPTION OF EMBODIMENTS (First Exemplary Embodiment)

Figure 1:
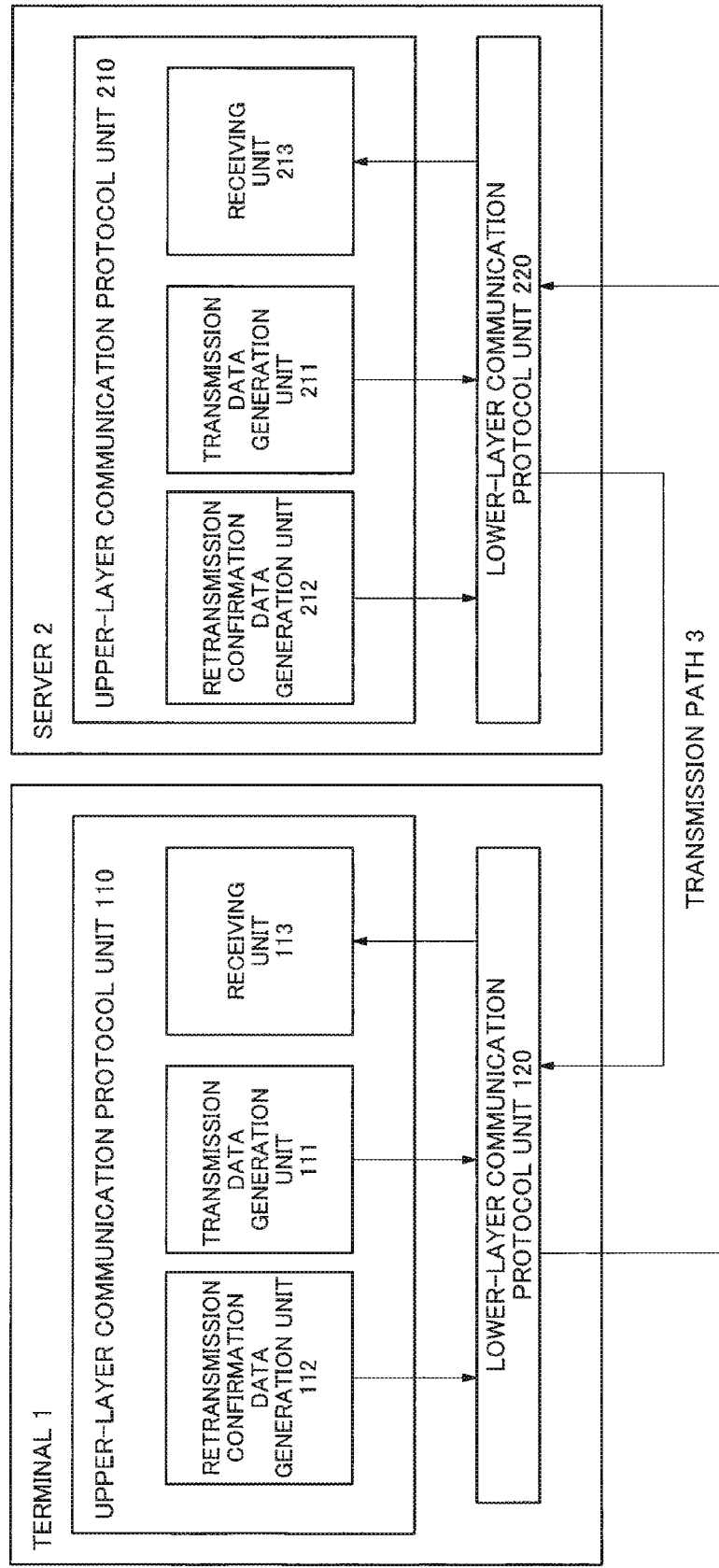
FIG. 1 is a block diagram illustrating a configuration of a communication system of a first exemplary embodiment.

Next, exemplary embodiments of the present invention are described in detail with reference to the drawings. FIG. 1 is a block diagram illustrating a configuration of a communication system 10 of a first exemplary embodiment of the present invention. The communication system 10 includes a terminal 1 and a server 2. The terminal 1 and the server 2 transmit and receive communication data to and from each other. In FIG. 1, the terminal 1 and the server 2 are directly connected to each other. However, the terminal 1 may be connected to the server 2 via a network.

The terminal 1 includes an upper-layer communication protocol unit 110 and a lower-layer communication protocol unit 120. The upper-layer communication protocol unit 110 includes a transmission data generation unit 111, a retransmission confirmation data generation unit 112, and a receiving unit 113.

The server 2 includes an upper-layer communication protocol unit 210 and a lower-layer communication protocol unit 220. The upper-layer communication protocol unit 210 includes a transmission data generation unit 211, a retransmission confirmation data generation unit 212, and a receiving unit 213.

Each of the units of the terminal 1 operates as follows. The transmission data generation unit 111 generates transmission data for which a process for reducing an increase in transmission time delay (referred to simply as "delay" below) (referred to as "delay reduction process" below) is necessary, and outputs the transmission data to the lower-layer communication protocol unit 120. The data generated by the transmission data generation unit 111 is transmitted to the server 2. After the transmission of the transmission data by the transmission data generation unit 111 to the lower-layer communication protocol unit 120, the retransmission confirmation data generation unit 112 generates retransmission confirmation data a predetermined number of times at predetermined time intervals, and outputs the retransmission confirmation data to the lower-layer communication protocol unit 120. The receiving unit 113 receives transmission data transmitted from the server 2 and received by the lower-layer communication protocol 120.

Here, "transmission data" is, primarily, data for which the delay reduction process is necessary among communication data transmitted by the terminal 1 to the server 2 (or by the server 2 to the terminal 1). "Retransmission confirmation data" is data generated corresponding to transmission data, in order to reduce an increase in delay attributable to retransmission of the transmission data. As described above, the upper-layer communication protocol unit 110 generates transmission data and retransmission confirmation data and outputs the transmission data and the retransmission confirmation data to the lower-layer communication protocol unit 120.

The upper-layer communication protocol unit 110 may output transmission data for which the delay reduction process is unnecessary, to the lower-layer communication protocol unit 120 via an unillustrated function unit, which is different from the transmission data generation unit 111. The transmission data for which the delay reduction process is unnecessary is data other than the transmission data among the communication data. When the upper-layer communication protocol unit 110 outputs the communication data for which the delay reduction process is unnecessary, to the lower-layer communication protocol unit 120, the retransmission confirmation data generation unit 112 does not output retransmission confirmation data to the lower-layer communication protocol unit 120.

Retransmission confirmation data is used by the receiving side to check the order of received packets. Accordingly, the retransmission confirmation data may be small data unrelated to the contents of the transmission data (such as characters, sounds, or images). For example, each packet of retransmission confirmation data may have the minimum size possible for the receiving side to distinguish the transmission data and the retransmission confirmation data and to check the receiving order of data including the transmission data.

The lower-layer communication protocol unit 120 converts the transmission data and the retransmission confirmation data input by the upper-layer communication protocol unit 110, into a form corresponding to the protocol used between the lower-layer communication protocol units 120 and 220. The lower-layer communication protocol unit 120 assigns a sequence number to each packet of the transmission data and the retransmission confirmation data. The lower-layer communication protocol unit 120 sequentially sends the transmission data and the retransmission confirmation data in series out to a transmission path 3 connected to the server 2. In other words, the lower-layer communication protocol unit 120 is a communication interface between the upper-layer communication protocol unit 110 and the transmission path 3. The lower-layer communication protocol unit 120 does not have the function of determining whether transmission data is data for which the delay reduction process is to be carried out. Specifically, the lower-layer communication protocol unit 120 sends the transmission data and the retransmission confirmation data as it is in a form of packets out to the transmission path 3, in the order of and at the timing of reception without being controlled by the upper-layer communication protocol unit 110.

The order of the data sent out to the transmission path 3 is checked on the basis of the sequence numbers assigned to the respective packets of the transmission data and the retransmission confirmation data.

The lower-layer communication protocol unit 120 of the terminal 1 further converts received data (transmission data and retransmission confirmation data transmitted from the server 2) into a form corresponding to the protocol used by the upper-layer communication protocol unit 110. The lower-layer communication protocol unit 120 then outputs the received data subjected to the protocol conversion, to the receiving unit 113. The lower-layer communication protocol unit 120 has a retransmission control function. Specifically, upon receipt of a certain or larger amount of data having an error in the order of the sequence numbers, from the server 2, the lower-layer communication protocol unit 120 transmits a notification for requesting retransmission, to the server 2.

Each of the units of the server 2 illustrated in FIG. 1 performs the same operation as the above-described operation of the unit of the terminal 1 having the same name. With this configuration, the transmission data transmitted from the upper-layer communication protocol unit 110 of the terminal 1 is received by the receiving unit 213 of the upper-layer communication protocol unit 210 of the server 2 via the lower-layer communication protocol units 120 and 220. Similarly, the transmission data transmitted from the upper-layer communication protocol unit 210 of the server 2 is received by the receiving unit 113 of the upper-layer communication protocol unit 110 of the terminal 1 via the lower-layer communication protocol units 220 and 120.

The communication system 10 may be configured so that communication data is transmitted only from the terminal 1 to the server 2. In such a case, the receiving unit 113, the retransmission confirmation data generation unit 212, and the transmission data generation unit 211 are not needed. Similarly, when communication data is transmitted only from the server 2 to the terminal 1, the receiving unit 213, the retransmission confirmation data generation unit 112, and the transmission data generation unit 111 are not needed.

Figure 2:
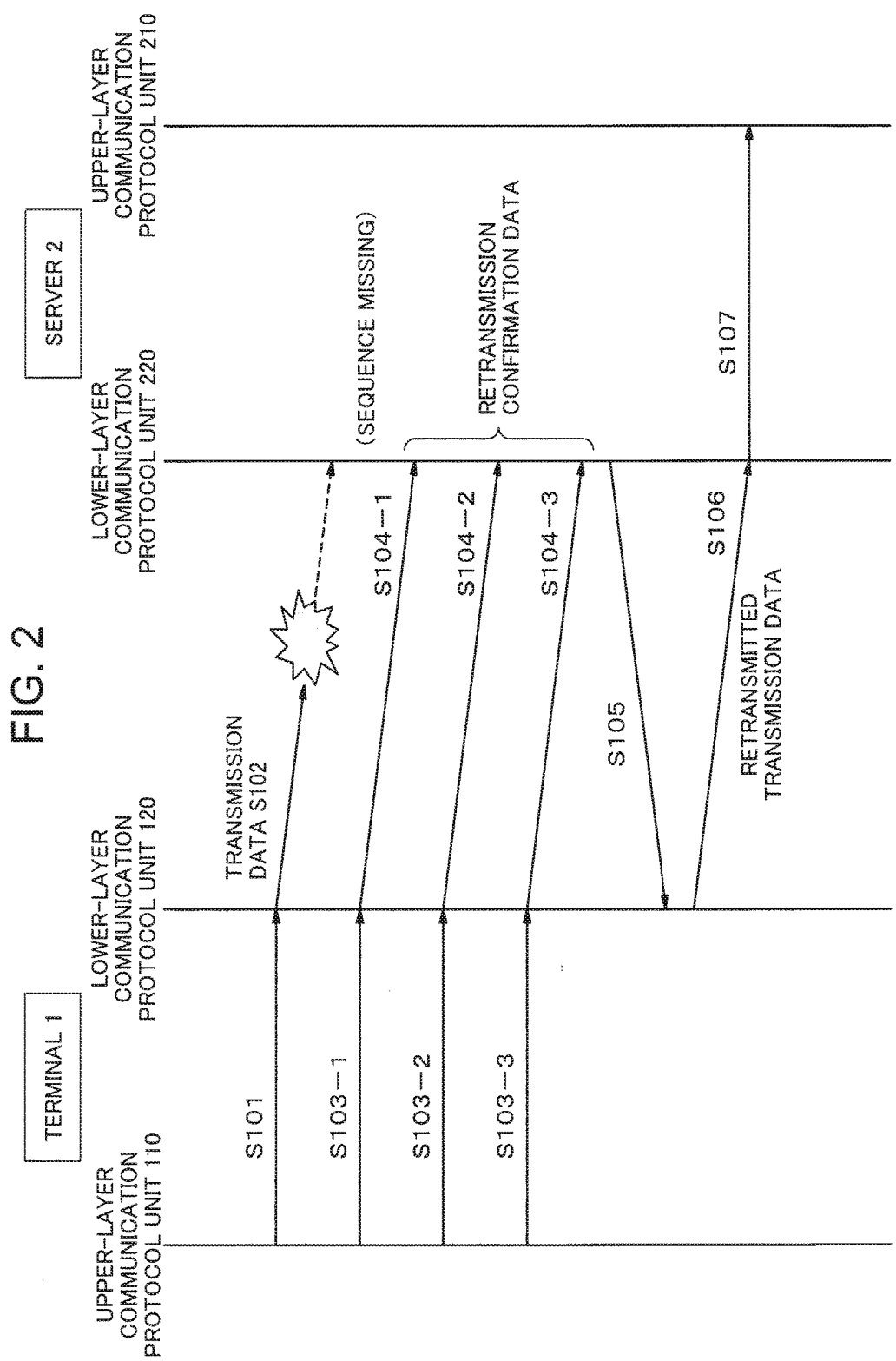
FIG. 2 is a diagram illustrating a communication sequence of the communication system.

Next, operation of the communication system 10 of the first exemplary embodiment is described with reference to the sequence in FIG. 2. FIG. 2 is a diagram illustrating a communication sequence of the communication system 10. FIG. 2 illustrates a case in which transmission data is transmitted from the terminal 1 to the server 2. When transmission data is transmitted from the server 2 to the terminal 1, the steps are performed in the reverse order.

First, in the terminal 1, the upper-layer communication protocol unit 110 outputs, via the transmission data generation unit 111, transmission data to the lower-layer communication protocol unit 120 (Step S101 in FIG. 2). The transmission data is subjected to protocol conversion in the lower-layer communication protocol unit 120 and is transmitted, as packets, from the terminal 1 to the server 2. In some cases, the transmission data may be lost due to a trouble in the transmission path (S102). In such a case, the data having the sequence number corresponding to Step S102 is missing in the lower-layer communication protocol unit 220, and the data received subsequently by the lower-layer communication protocol unit 220 is received as data having an error in the order of sequence numbers.

Upon elapse of a certain time period after the transmission of the transmission data in Step S101, the upper-layer communication protocol unit 110 outputs, via the retransmission confirmation data generation unit 112, retransmission confirmation data a predetermined number of times at predetermined transmission intervals (S103-1 to S103-3). The retransmission confirmation data is subjected to protocol conversion in the lower-layer communication protocol unit 120 as the transmission data. The data being had the protocol conversion is transmitted from the terminal 1 to the server 2 (S104-1 to S104-3).

When receiving a certain number of retransmission confirmation data in a state where a sequence number of received data is missing, the lower-layer communication protocol unit 220 of the server 2 judges that there is an error in the order of the received data. The lower-layer communication protocol unit 220 then requests the lower-layer communication protocol unit 120 of the terminal 1 to retransmit the transmission data corresponding to the sequence number in Step S102 (S105). In response to the retransmission request, the lower-layer communication protocol unit 120 retransmits the transmission data to the lower-layer communication protocol unit 220 (S106). Upon arrival of the transmission data at the upper-layer communication protocol unit 210 of the server 2 as a result of the retransmission of the transmission data (S107), the retransmission of the transmission data is completed.

In Step S105 in FIG. 2, when the lower-layer communication protocol unit 220 has received the retransmission confirmation data three times in a state where the transmission data is missing (S104-1 to 3), the server 2 requests the terminal 1 to retransmit the transmission data. However, this is an example, and each of the number of times the retransmission confirmation data is transmitted from the terminal 1 and an enough number of times the retransmission confirmation data is received for the server 2 to request retransmission is not limited to three. In addition, retransmission request may be issued when the number of times data including data other than the retransmission confirmation data is received has reached a predetermined value.

The number of times and the interval at which retransmission confirmation data is transmitted may be determined on the basis of a setting value in the lower-layer communication protocol unit 120 or a past transmission history of transmission data. Furthermore, when transmission data is received in the correct order, the lower-layer communication protocol unit 220 of the server 2 may delete received retransmission confirmation data.

The retransmission procedure using retransmission confirmation data illustrated in FIG. 2 is carried out only when communication data transmitted from the terminal 1 to the server 2 is transmission data for which the delay reduction process is necessary. When the delay reduction process is unnecessary for communication data transmitted from the terminal 1 to the server 2, the retransmission confirmation data generation unit 112 does not generate retransmission confirmation data. Accordingly, when communication data for which the delay reduction process is unnecessary is transmitted, retransmission confirmation data is neither transmitted nor received. This consequently reduces the load of the communication process imposed on the terminal 1 and the server 2 in the communication system 10 in comparison with that imposed in the case of the configuration in which retransmission confirmation data is transmitted for all communication data. Data for which the delay reduction process is unnecessary may be subjected to retransmission control which is normally provided in the lower-layer communication protocol units 120 and 220.

The communication system 10 of the first exemplary embodiment having the above configuration has effects of being able to reduce the delay caused by retransmission without imposing heavy load on the transmitter/receiver device and the network. The reason is because the terminal 1 transmits retransmission confirmation data only for transmission data for which delay is to be reduced.

(Second Exemplary Embodiment)

Next, description is given of a second exemplary embodiment of the present invention, focusing mainly on the respects different from the first exemplary embodiment, with reference to the drawings.

Assume a case where, during transmission of transmission data from the terminal 1 to the server 2, the interval at which the transmission data is transmitted becomes shorter for some reason. In such a case, before the completion of the transmission of all the retransmission confirmation data, the next transmission data may be transmitted when the number of times and the interval at which retransmission confirmation data is transmitted are fixed.

Further, transmission of the next transmission data in the period where retransmission confirmation data is transmitted may temporarily increase the load of the transmitting process on the terminal 1 and the load of the receiving process on the server 2. The amount of such a temporal increase in load becomes larger as the timing at which the retransmission confirmation data is transmitted and the timing at which the next transmission data is transmitted is closer. Furthermore, in the worst case, the retransmission confirmation data and the transmission data are transmitted at the same timing, and it is necessary to wait to transmit one of the data until the other data is transmitted, consequently causing a delay in transmission of the retransmission confirmation data or the transmission data in some cases. In other words, when the timing at which the retransmission confirmation data is transmitted and the timing at which the transmission data is transmitted are the same, the start of the retransmission of the transmission data may be delayed, or the delay of the transmission data may become larger, in addition to the temporal increase in load.

In the second exemplary embodiment, description is given of a procedure for transmitting retransmission confirmation data within the interval at which transmission data is transmitted, in order to prevent a temporal increase in load imposed on each of the terminal 1 and the server 2 due to the next transmission data being transmitted in the period where the retransmission confirmation data is transmitted.

Figure 3:
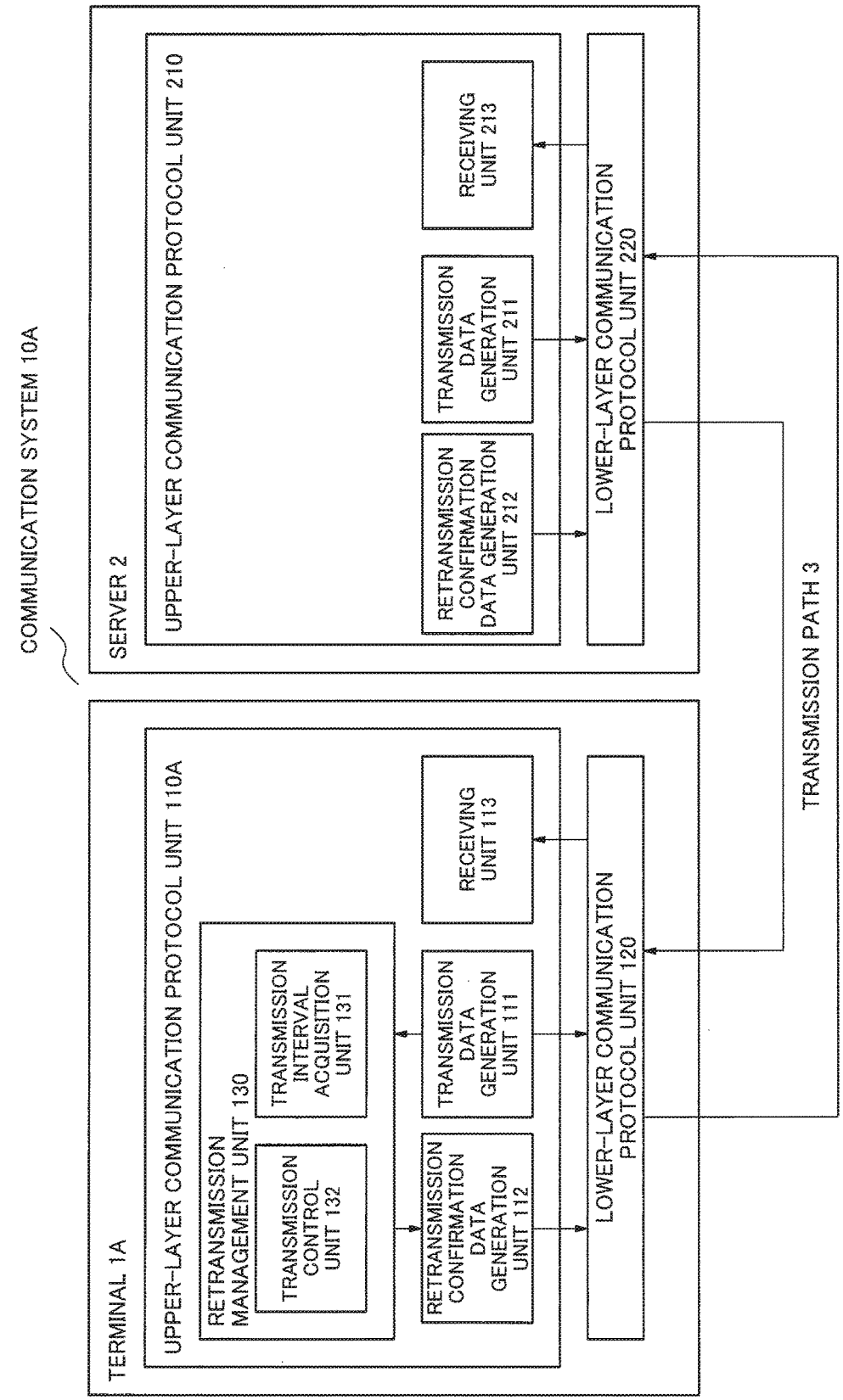
FIG. 3 is a block diagram illustrating a configuration of a communication system of a second exemplary embodiment.

FIG. 3 is a block diagram illustrating a configuration of a communication system 10A of the second exemplary embodiment. The communication system 10A includes a terminal 1A and a server 2. In FIG. 3, similar components as those in FIG. 1 are denoted by similar names and reference signs, and the same description as that of FIG. 1 is omitted.

The terminal 1A includes a retransmission management unit 130 in addition to the configuration of the terminal 1 of the first exemplary embodiment. The retransmission management unit 130 includes a transmission interval acquisition unit 131 and a transmission control unit 132. In the second exemplary embodiment, the server 2 included in the communication system 10A has a configuration similar to the server 2 of the first exemplary embodiment. However, the server 2 of the second exemplary embodiment may further include a retransmission management unit similar to the retransmission management unit 130 of the terminal 1A.

The units of the terminal 1A and the server 2 operate as follows. In the second exemplary embodiment, the number of times and the intervals at which the retransmission confirmation data is transmitted are controlled so that, even when the interval at which transmission data is transmitted becomes shorter, the transmission of retransmission confirmation data is completed within the interval at which the transmission data is transmitted.

The transmission interval acquisition unit 131 acquires a transmission interval, which is the interval at which a transmission data generation unit 111 outputs transmission data to a lower-layer communication protocol unit 120. The transmission control unit 132 determines the number of output times and the transmission interval at which retransmission confirmation data is output from a retransmission confirmation data generation unit 112, on the basis of the currently set number of times and the currently set interval at which retransmission confirmation data is transmitted as well as the transmission interval of the transmission data, which is acquired by the transmission interval acquisition unit 131. Here, the lower-layer communication protocol unit 120 sends data input from the transmission data generation unit 111 and the retransmission confirmation data generation unit 112, out to a transmission path 3, as they are. Accordingly, the transmission interval of the transmission data output from the transmission data generation unit 111 and the transmission interval of the retransmission confirmation data output from the retransmission confirmation data generation unit 112 are usually the same respectively as the interval of the transmission data and the interval of the retransmission confirmation data to be sent out from the lower-layer communication protocol unit 120 to the transmission path 3.

Figure 4:
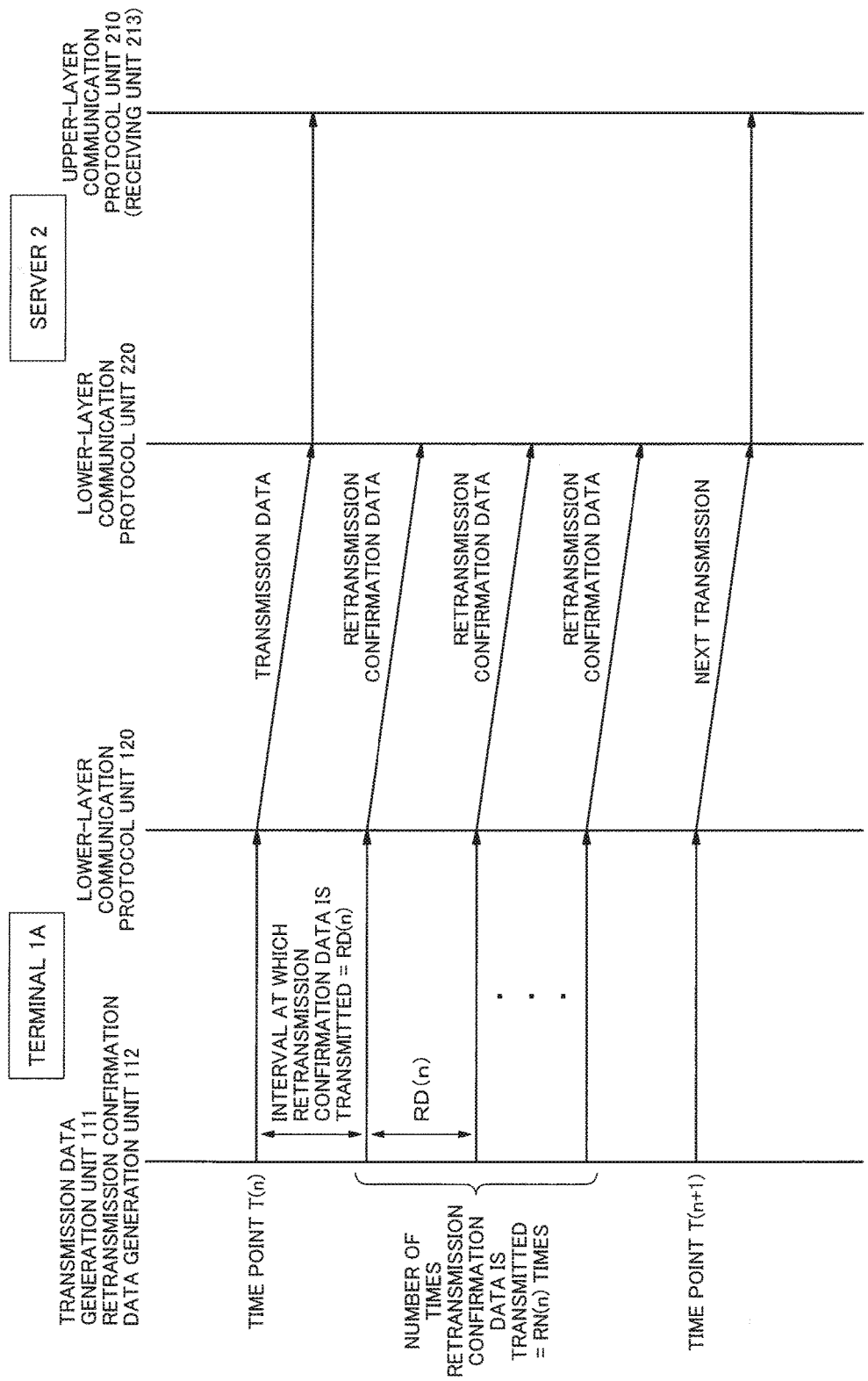
FIG. 4 is a diagram for illustrating a method of determining the number of times of retransmission confirmation data and an interval at which retransmission confirmation data is transmitted, in a transmission control unit.

An example of a procedure for determining the number of times and the interval at which retransmission confirmation data is transmitted is described below by use of the interval at which transmission data is transmitted, which is acquired by the transmission interval acquisition unit 131, with reference to FIG. 4. FIG. 4 is a diagram for illustrating a method employed in the transmission control unit 132 to determine the number of times and the interval at which retransmission confirmation data is transmitted.

Assume that the time point at which the n-th (where n is a natural number) transmission data is transmitted is denoted as $T(n)$, the interval at which retransmission confirmation data for the n-th transmission data is transmitted is denoted as $RD(n)$, the number of times the retransmission confirmation data is transmitted is denoted as $RN(n)$, a current preset value of the interval at which retransmission confirmation data is transmitted is denoted as RD, and a current preset value of the number of times retransmission confirmation data is transmitted is denoted as RN. In the second exemplary embodiment, $RD(n)$ and $RN(n)$ are obtained according to Equation (1) and Equation (2) below.

$$RN(n)=\min(\mathrm{Floor}((T(n+1)-T(n))/RD),RN) \qquad (1)$$

$$RD(n)=(T(n+1)-T(n))/(RN(n)+1) \qquad (2)$$

In the above equations, min(A,B) denotes the smaller one of the numeric values A and B. Floor(A) denotes the largest integer that is not larger than A; for example, Floor(5.3)=5.

In Equation (1), the number of times at which retransmission confirmation data is transmitted when the interval at which retransmission confirmation data is transmitted is the preset value (RD) at the transmission interval $(T(n+1)-T(n))$ acquired on the basis of the transmission time points of transmission data is compared with the preset number of times retransmission confirmation data is transmitted, and the smaller one of the numbers of transmission times is obtained as the new number of transmission times $RN(n)$. In Equation (2), a new transmission interval for transmitting retransmission confirmation data $RN(n)$ times at the acquired transmission interval $(T(n+1)-T(n))$ is obtained as $RD(n)$. Here, $RD(n)$ is a transmission interval and hence does not need to be an integer. However, a value smaller than a calculation result obtained according to Equation (2) may be set as $RD(n)$, for example, through a procedure of dropping the decimal places of the calculation result obtained according to Equation (2).

The transmission interval acquisition unit 131 may acquire the time points T(n) and T(n+1), at which the n-th and n+1-th transmission data are to be transmitted, from the transmission data generation unit 111. Alternatively, the transmission data generation unit 111 may have the function of recording each time point at which the transmission data has been transmitted in the past, and the transmission interval acquisition unit 131 may use the interval at which the transmission data has been transmitted, the interval being obtained on the basis of the difference between the past transmission time points, as the transmission interval (T(n+1)−T(n)) in Equations (1) and (2).

The transmission data generation unit 111 of the terminal 1A transmits transmission data to the lower-layer communication protocol unit 120 at the transmission interval (T(n+1)−T(n)). The retransmission confirmation data generation unit 112 transmits retransmission confirmation data to the lower-layer communication protocol unit 120 in accordance with the number of transmission times RN(n) and the transmission interval RD(n) calculated according to Equations (1) and (2).

The transmission data and the retransmission confirmation data transmitted from the lower-layer communication protocol unit 120 are received by the lower-layer communication protocol unit 220 of the server 2. When the transmission data and the retransmission confirmation data are received by the lower-layer communication protocol unit 220 in the correct order, the lower-layer communication protocol unit 220 transmits the transmission data to the receiving unit 213 of the upper-layer communication protocol unit 210. When the transmission data is properly received, the lower-layer communication protocol unit 220 may discard the retransmission confirmation data. The receiving unit 213 receives the transmission data from the lower-layer communication protocol unit 220.

In contrast, when the transmission data and the retransmission confirmation data are received in an incorrect order, for example, due to a lack of transmission data, the lower-layer communication protocol unit 220 requests the terminal 1A to retransmit the transmission data, in the procedure illustrated in FIG. 2.

In the communication system 10A of the second exemplary embodiment, the transmission interval acquisition unit 131 acquires the actual transmission interval of transmission data, and the transmission control unit 132 calculates the number of times and the interval at which retransmission confirmation data is transmitted, on the basis of the acquired transmission interval. In other words, in the second exemplary embodiment, the transmission of the retransmission confirmation data can be completed within the interval at which the transmission data is transmitted, by adjusting the number and the interval at which the retransmission confirmation data is transmitted, using Equations (1) and (2) on the basis of the interval at which the transmission data is transmitted.

As described above, the communication system 10A of the second exemplary embodiment changes the number of times and the interval at which retransmission confirmation data is transmitted, when the interval at which transmission data is transmitted becomes short. With this operation, the communication system 10A of the second exemplary embodiment produces the effect of preventing a temporal increase in load imposed on each of the terminal 1A and the server 2 attributable to transmission of the next transmission data, in addition to the effects of the first exemplary embodiment.

FIG. 4 illustrates data transmission from the terminal 1A to the server 2. However, the communication system 10A can carry out data transmission from the server 2 to the terminal 1A in a similar procedure as that in FIG. 4.

(Modified Example of First and Second Exemplary Embodiments)

In the first exemplary embodiment and the second exemplary embodiment, the units such as the retransmission confirmation data generation unit 112 and the retransmission management unit 130 are included in the upper-layer communication protocol units 110 and 110A in the terminals 1 and 1A. However, the transmission data generation unit 111 and the retransmission confirmation data generation unit 112 may be provided, for example, between the upper-layer communication protocol unit 110 and the lower-layer communication protocol unit 120, or inside the lower-layer communication protocol unit 120.

When the retransmission confirmation data generation unit 112 is provided outside the upper-layer communication protocol unit 110, the retransmission confirmation data generation unit 112 needs to find out whether communication data output from the upper-layer communication protocol unit 110 is data for which the delay reduction process is necessary (i.e., whether retransmission confirmation data needs to be generated).

Figure 5:
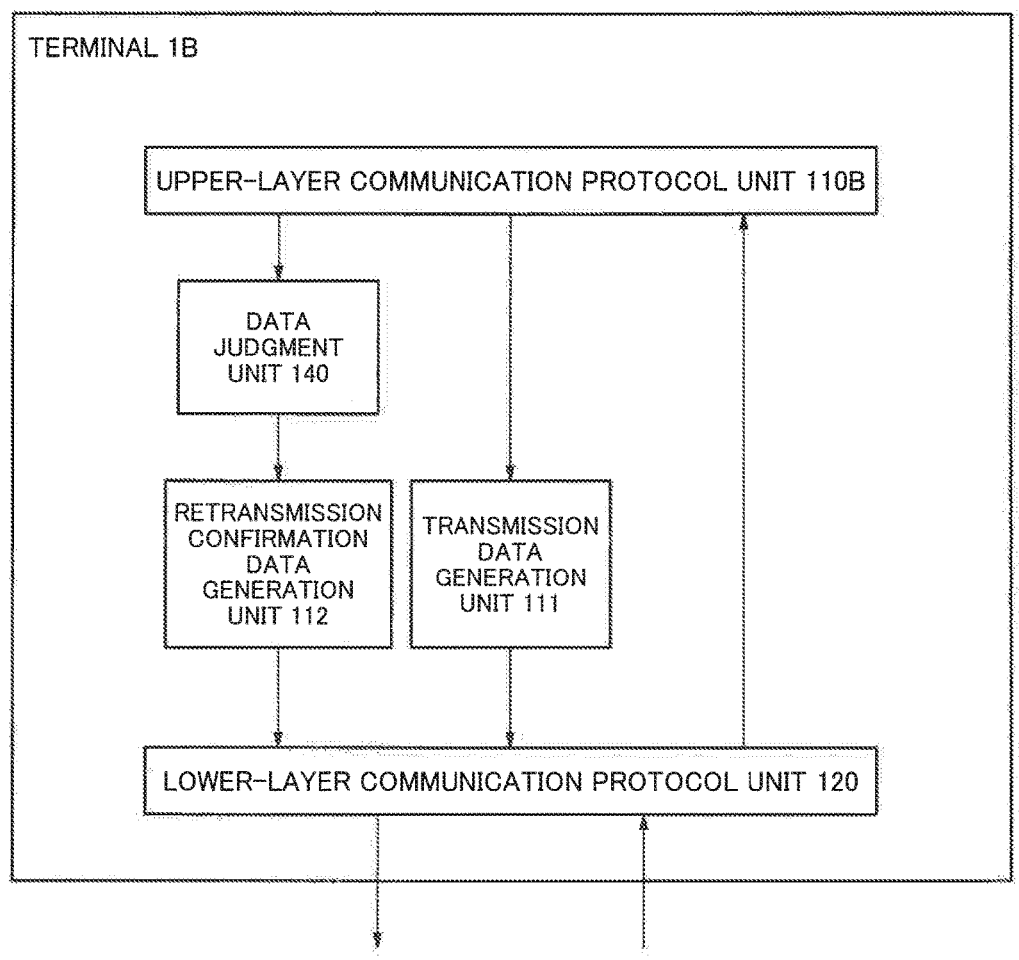
FIG. 5 is a diagram illustrating a configuration of a terminal according to a modified example of the first and second exemplary embodiments.

FIG. 5 is a diagram illustrating a configuration of a terminal 1B in a modified example of the first and second exemplary embodiments. The terminal 1B in FIG. 5 is different from the terminals 1 and 1A illustrated in FIG. 1 and FIG. 3 in that the transmission data generation unit 111 and the retransmission confirmation data generation unit 112 are provided outside an upper-layer communication protocol unit 110B and that the terminal 1B further includes a data judgment unit 140. The upper-layer communication protocol unit 110B corresponds to the configuration obtained by omitting the transmission data generation unit 111 and the retransmission confirmation data generation unit 112 from the upper-layer communication protocol unit 110 of the first exemplary embodiment or the upper-layer communication protocol unit 110A of the second exemplary embodiment.

The data judgment unit 140 acquires, from the upper-layer communication protocol unit 110B, information indicating whether communication data output from the upper-layer communication protocol unit 110A to the transmission data generation unit 111 is data for which the delay reduction process is to be carried out (transmission data), separately from the transmission data. The data judgment unit 140 then notifies the retransmission confirmation data generation unit 112 of the acquired information. The retransmission confirmation data generation unit 112 generates retransmission confirmation data on the basis of the information acquired from the data judgment unit 140.

For example, when the information acquired from the upper-layer communication protocol unit 110B via the data judgment unit 140 indicates that the communication data output from the upper-layer communication protocol unit 110B to the transmission data generation unit 111 is transmission data, the retransmission confirmation data generation unit 112 transmits, after the transmission data is output from the transmission data generation unit 111 to the lower-layer communication protocol unit 120, retransmission confirmation data corresponding to the transmission data, to the lower-layer communication protocol unit 120 a predetermined number at predetermined intervals. The number and the interval of the retransmission confirmation data may be obtained according to Equations (1) and (2).

In contrast, when the information acquired by the retransmission confirmation data generation unit 112 from the upper-layer communication protocol unit 110B indicates that the communication data output from the upper-layer communication protocol unit 110B is not transmission data, the communication data is not data for which the delay reduction process is to be carried out. Accordingly, when the communication data is not transmission data, the retransmission confirmation data generation unit 112 does not output retransmission confirmation data corresponding to the communication data to the lower-layer communication protocol unit 120.

The terminal 1B having the above-described configuration can transmit retransmission confirmation data only for transmission data. Hence, even using the terminal 1B in the communication system 10 of the first exemplary embodiment or the communication system 10B of the second exemplary embodiment can similarly reduce a delay due to retransmission without imposing heavy load on the transmitter/receiver device and the network.

(Another Modified Example of Second Exemplary Embodiment)

In the second exemplary embodiment, the units such as the retransmission confirmation data generation unit 112 and the retransmission management unit 130 may have the function of acquiring the state of the load required for the transmitting process in the lower-layer communication protocol unit 120. Examples of the load in the lower-layer communication protocol unit 120 are the utilization of a central processing unit (CPU) included in a corresponding one of the terminals 1, 1A, and 1B, and the amount of data input to and output from the lower-layer communication protocol unit 120, although not limited thereto. The number of times RN(n) and the interval RD(n) at which retransmission confirmation data is transmitted, which are obtained according to Equations (1) and (2), may be adjusted according to the state of the load in the lower-layer communication protocol unit 120. For example, when the load of the transmitting process in the lower-layer communication protocol unit 120 is heavy, setting a smaller value for RN(n) and a larger value for RD(n) can reduce the load of the transmitting process in the lower-layer communication protocol unit 120.

When the load of the transmitting process in the lower-layer communication protocol unit 120 is low, a larger value may be set for RN(n) and a smaller value may be set for RD(n). Specifically, when the load of the transmitting process in the lower-layer communication protocol unit 120 is light, setting a larger value for the number of times RN(n) retransmission confirmation data is transmitted and a smaller value for the interval RD(n) at which retransmission confirmation data is transmitted accelerates the transmission of the retransmission confirmation data, and consequently can reduce an increase in delay due to retransmission. Hence, by changing the number of times and the interval at which retransmission confirmation data is transmitted, according to the state of load of the process of transmitting retransmission confirmation data in the lower-layer communication protocol unit 120 enables transmission of retransmission confirmation data adapted to the load in the lower-layer communication protocol unit 120.

(Third Exemplary Embodiment)

Figure 6:
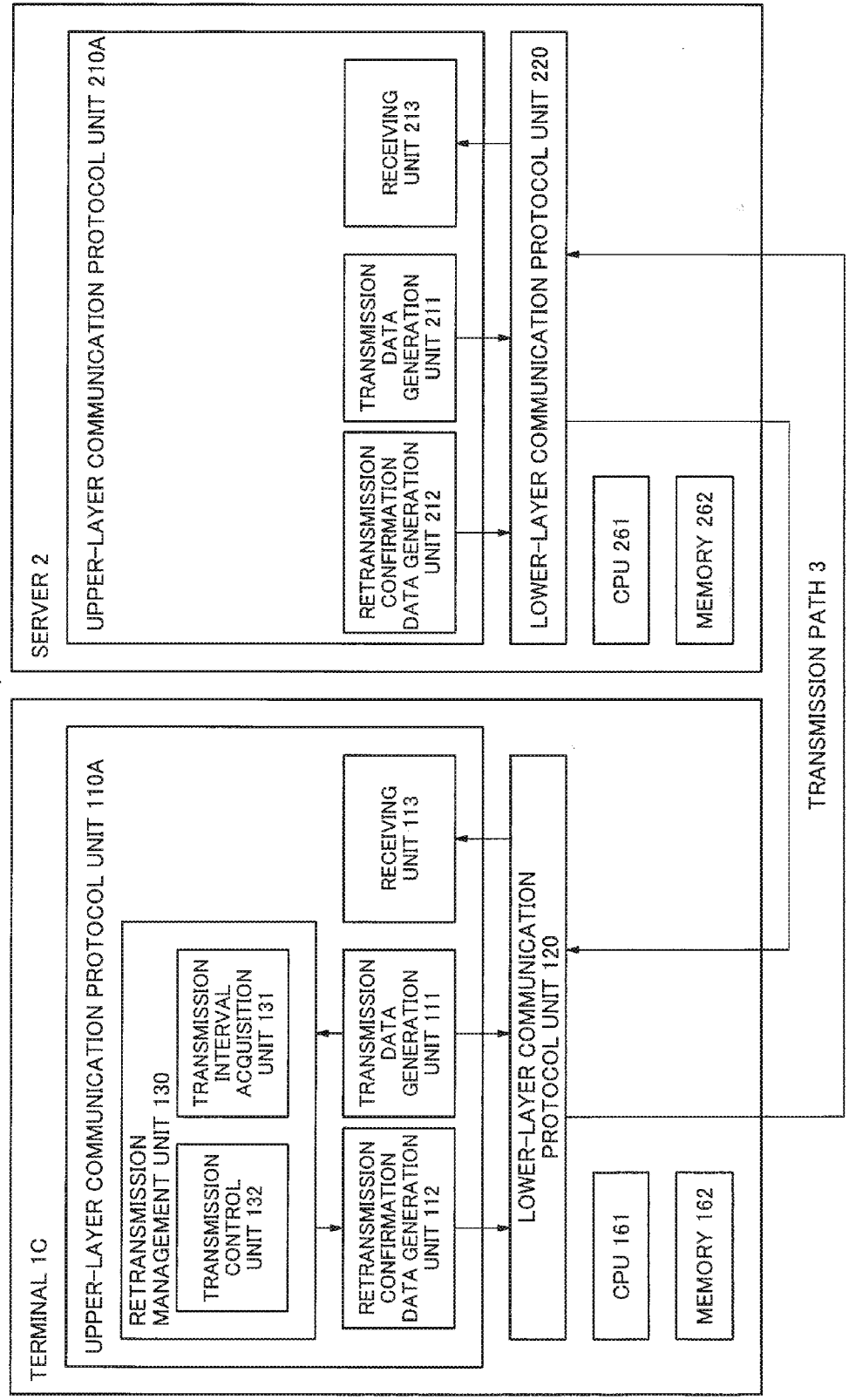
FIG. 6 is a block diagram illustrating a configuration of a communication system of a third exemplary embodiment.

As a third exemplary embodiment, operation in the second exemplary embodiment is described with concrete numeric values. FIG. 6 is a block diagram illustrating a configuration of a communication system 10B of the third exemplary embodiment. The communication system 10B includes a terminal 1C and a server 2. The terminal 1C further includes a CPU 161 and a memory 162. The server 2 further includes a CPU 261 and a memory 262. The CPUs 161 and 261 control each unit in the corresponding one of the terminal 1C and the server 2 by executing a program stored in the corresponding one of the memories 162 and 262.

Application software is installed in each of upper-layer communication protocol units 110A and 210A of the terminal 1C and the server 2. A wireless-protocol control software is installed in each of lower-layer communication protocol units 120 and 220. The functions of the application software and a wireless protocol of the terminal 1C may be implemented by programs executed by the CPUs 161 and 261. The application software executed by the upper-layer communication protocol unit 110A of the terminal 1 transmits and receives communication data to and from an application executed by the upper-layer communication protocol unit 210A of the server 2, via the wireless protocols included in the lower-layer communication protocol units 120 and 220.

Upon receipt of three or more pieces of data from the transmission path 3 in a state where a sequence number is missing, the wireless protocol used in the communication system 10B requests the wireless protocol of the source of the transmission data to retransmit the transmission data corresponding to the missing sequence number. Assume that, in the third exemplary embodiment, the interval (T(n+1)−T(n)) at which the application of the terminal 1C transmits transmission data to the server 2 is ten, the preset number of times RN retransmission confirmation data is transmitted is three times, and the preset interval RD at which retransmission confirmation data is transmitted is four.

When the application of the upper-layer communication protocol unit 110A of the terminal 1C transmits n-th transmission data n, the transmission data n is converted into the form used by the wireless protocol in the lower-layer communication protocol unit 120 and is then transmitted from the terminal 1C to the server 2.

The terminal 1C obtains the number of times and the interval at which retransmission confirmation data is transmitted, by use of the interval at which transmission data is transmitted(=10), the preset number of times retransmission confirmation data is transmitted, RN=3, and the preset time interval at which retransmission confirmation data is transmitted, RN=4, according to Equations (1) and (2). The number of times RN(n) retransmission confirmation data is transmitted is, according to Equation (1): $RN(n)=\min(\text{Floor}(10/4),3)=\min(2,3)=2$. The transmission interval RD(n) is, according to Equation (2): $RD(n)=10/(2+1)=3.3$. Accordingly, in the third exemplary embodiment, $RD(n)=3$.

Upon elapse of the time period corresponding to the transmission interval(=3) after the transmission of the transmission data n, the terminal 1C transmits the first retransmission confirmation data. Upon elapse of the time period corresponding to the transmission interval RD(n)=3 after the transmission of the first retransmission confirmation data, the terminal 1 transmits the second retransmission confirmation data. Since the number of transmission times is RN(n)=2, the transmission of the retransmission confirmation data is completed after the retransmission confirmation data is transmitted twice. Upon elapse of the time period corresponding to four after the transmission of the second retransmission confirmation data, the time which has elapsed after the transmission of the data n reaches 10

(=3+3+4) which is the transmission interval of the transmission data, and hence the terminal 1 transmits transmission data n+1. The number of times and the interval at which retransmission confirmation data is transmitted in the time period after the transmission of the transmission data n+1 before the transmission of the next transmission data n+2 are calculated similarly in the above-described procedure.

Here, assume a case where the transmission data n is lost and does not arrive at the server 2. In this case, the lower-layer communication protocol unit 220 of the server 2 checks the sequence number of each received communication data. The lower-layer communication protocol unit 220 receives retransmission confirmation data twice and the data n+1, which is the next transmission data, without receiving the data n. In other words, the lower-layer communication protocol unit 220 receives three pieces of data in the state of having an error in the sequence numbers. Such being the case, the lower-layer communication protocol unit 220 requests the lower-layer communication protocol unit 120 of the terminal 1C to retransmit the data n. Consequently, the data n is retransmitted by the wireless protocol of the terminal 1C and is then received by the server 2.

In contrast, when the terminal 1C does not have the function of transmitting retransmission confirmation data, the timing at which the server 2 receives three pieces of data in an incorrect order is after receiving the n+3-th transmission data n+3 in the server 2. Hence, the communication system 10B of the third exemplary embodiment can similarly reduce an increase in transmission delay due to retransmission, by transmitting retransmission confirmation data.

When the preset number of times retransmission confirmation data is transmitted is RN=3 and the preset time interval at which retransmission confirmation data is transmitted is RN=4 in the communication system 10B of the third exemplary embodiment, the time period after the transmission of transmission data before the completion of the transmission of retransmission confirmation data is 4×3=12. Since the interval at which transmission data is transmitted is 10, the next transmission data may be transmitted before the completion of the transmission of the retransmission confirmation data with this preset value. However, in the third exemplary embodiment, the number and the interval at which retransmission confirmation data is transmitted are changed on the basis of the interval at which transmission data is transmitted, by use of Equations (1) and (2). This configuration makes it possible to complete the transmission of retransmission confirmation data within the interval at which transmission data is transmitted.

Description is given of the data transmission from the terminal 1B or 1C to the server 2 in the above-described modified example of the second exemplary embodiment and the third exemplary embodiment. However, effects similar to those of each of the exemplary embodiments can be obtained in data transmission from the server 2 to the terminal 1B or 1C, by applying the configuration of the terminal 1B or 1C to the server 2.

(Fourth Exemplary Embodiment)

Figure 7:
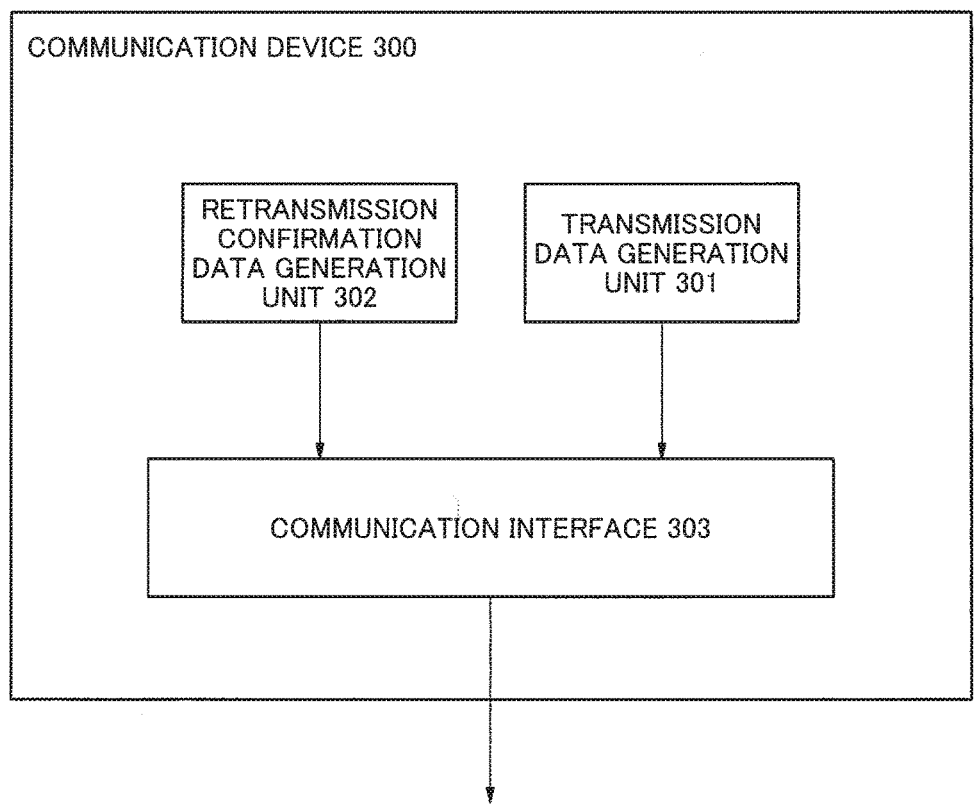
FIG. 7 is a block diagram illustrating a configuration of a communication device of a fourth exemplary embodiment.

FIG. 7 is a block diagram illustrating a configuration of a communication device 300 of a fourth exemplary embodiment of the present invention. The communication device 300 includes a transmission data generation unit 301, a retransmission confirmation data generation unit 302, and a communication interface 303.

The transmission data generation unit 301 outputs, as transmission data, data for which a delay reduction process is to be carried out, to the communication interface 303. After the output of the transmission data, the retransmission confirmation data generation unit 302 outputs retransmission confirmation data to the communication interface 303 a predetermined number of times at predetermined transmission intervals.

The transmission data and the retransmission confirmation data are input to the communication interface 303. Then, the communication interface 303 assigns order information to each of the transmission data and the retransmission confirmation data and transmits the retransmission confirmation data to an external unit after transmitting the transmission data to the external unit.

The communication device having such a configuration transmits, subsequently to transmission data, retransmission confirmation data for the transmission data for which the delay reduction process is to be carried out. For this reason, when the transmission data for which the delay reduction process is to be carried out is lost during the transmission, the destination of the transmission data can detect that data including the retransmission confirmation data are received in an incorrect order on the basis of the order information. As a result of this, the destination of the transmission data can request the communication device to retransmit the transmission data for which the delay reduction process is to be carried out, at an early stage.

In other words, the communication device of the fourth exemplary embodiment can reduce a delay due to retransmission without imposing heavy load on the transmitter/receiver device and the network, by transmitting, for transmission data for which the delay reduction process is to be carried out, retransmission confirmation data.

INDUSTRIAL APPLICABILITY

The present invention is applicable to a communication device used in a system carrying out communications, such as voice communications, that are likely to be affected on communication quality due to delay.

The present invention is described above by taking the above-described exemplary embodiments as typical examples. However, the present invention is not limited to the above-described exemplary embodiments. In other words, the present invention can apply any of various modes that can be understood by those skilled in the art, within the scope of the present invention.

This application claims the priority based on Japanese Patent Application No. 2013-194364, filed on Sep. 19, 2013, the entire disclosure of which is incorporated herein.

REFERENCE SIGNS LIST 1, 1A, 1B, 1C terminal
2 server
3 transmission path
10, 10A, 10B communication system
110, 110A, 110B, 210, 210A upper-layer communication protocol unit
111, 211, 301 transmission data generation unit
112, 212, 302 retransmission confirmation data generation unit
113, 213 receiving unit
120, 220 lower-layer communication protocol unit
130, 230 retransmission management unit
131, 231 transmission interval acquisition unit
132, 232 transmission control unit
140 data judgement unit
161, 261 CPU
162, 261 memory 300 communication device
303 communication interface

What is claimed is:

1. A communication system comprising a communication device and a receiver device, the communication device comprising:
a transmission data generator configured to output, as transmission data, communication data for which an increase in transmission delay is to be reduced;
a retransmission confirmation data generator configured to output, after the transmission data is output, retransmission confirmation data, whose size is smaller than the transmission data, a first number of times at a first transmission interval; and
a communication interface circuit configured to assign order information indicating a transmission order, to each of the transmission data and the retransmission confirmation data, and transmit, after the transmission data is transmitted, the retransmission confirmation data, and the receiver device comprising:
a lower-layer communication protocol circuit configured to judge that there is an error in the order information of received data, which are the transmission data received and the retransmission confirmation data received, upon receiving a certain number of the retransmission confirmation data in a state where a sequence number of the received data is missing and
to request the communication device to retransmit the transmission data corresponding to the sequence number being missed.

2. The communication device according to claim 1, further comprising:
a transmission interval acquisition circuit configured to acquire a second transmission interval, which is an interval at which the transmission data is output from the transmission data generator; and
a transmission controller configured to obtain a new one of the first transmission interval and a new one of the first number of times based on the second transmission interval.

3. The communication device according to claim 2, wherein, when
a time point at which an n-th one (n is a natural number) of the transmission data is denoted as $T(n)$,
an interval at which the retransmission confirmation data corresponding to the n-th transmission data is transmitted is denoted as $RD(n)$,
number of times the retransmission confirmation data corresponding to the n-th transmission data is transmitted is denoted as $RN(n)$,
a preset value of the first transmission interval is denoted as $RD$, and
a preset value of the first number of times is denoted as $RN$,
the transmission controller obtains the $RN(n)$ and the $RD(n)$ according to
$RN(n)=\min(\mathrm{Floor}((T(n+1)-T(n))/RD),RN)$ and
$RD(n)=(T(n+1)-T(n))/(RN(n)+1)$
where $\min(A,B)$ indicates a smaller value of numeric values A and B, $\mathrm{Floor}(A)$ indicates a maximum integer that is not larger than A, $RD(n)$ indicates the new first transmission interval, and $RN(n)$ indicates the new first number of times.

4. The communication device according to claim 3, wherein the transmission interval acquisition circuit acquires $(T(n+1)-T(n))$ as an interval at which the transmission data is transmitted, based on time points at which the transmission data is transmitted in past.

5. The communication device according to claim 3, wherein the transmission controller acquires load on the communication interface and further obtains at least one of the $RN(n)$ and the $RD(n)$ based on the load.

6. The communication device according to claim 1 further comprising an upper-layer communication protocol circuit configured to judge whether the communication data is the communication data other than the transmission data or the transmission data, and output a result of the judgment as a judgment result.

7. The communication device according to claim 6, further comprising a data judgment circuit configured to judge the judgment result from the upper-layer communication protocol circuit and instruct, when the judgment result indicates that the communication data is the transmission data, the retransmission confirmation data generator to generate the retransmission confirmation data.

8. A control method for a communication between a communication device and a receiver device, the control method comprising:
outputting, from the communication device to the receiver device, communication data for which an increase in transmission delay is to be reduced, as transmission data;
outputting, from the communication device to the receiver device, after outputting the transmission data, retransmission confirmation data, whose size is smaller than the transmission data, a first number of times at a first transmission interval;
assigning order information indicating a transmission order, to each of the transmission data and the retransmission confirmation data, and transmitting the retransmission confirmation data after transmitting the transmission data;
receiving the communication data and the retransmission confirmation data;
judging that there is an error in the order information of received data, which are the transmission data received and the retransmission confirmation data received, upon receiving a certain number of the retransmission confirmation data in a state where a sequence number of the received data is missing and
requesting the communication device to retransmit the transmission data corresponding to the sequence number being missed.

9. The communication device according to claim 4, wherein the transmission controller acquires load on the communication interface and further obtains at least one of the $RN(n)$ and the $RD(n)$ based on the load.

10. The communication device according to claim 2, further comprising an upper-layer communication protocol circuit configured to judge whether the communication data is the communication data other than the transmission data or the transmission data, and output a result of the judgment as a judgment result.

11. The communication device according to claim 3, further comprising an upper-layer communication protocol circuit configured to judge whether the communication data is the communication data other than the transmission data or the transmission data, and output a result of the judgment as a judgment result.

12. The communication device according to claim 4, further comprising an upper-layer communication protocol circuit configured to judge whether the communication data is the communication data other than the transmission data or the transmission data, and output a result of the judgment as a judgment result.

13. The communication device according to claim 5, further comprising an upper-layer communication protocol circuit configured to judge whether the communication data is the communication data other than the transmission data or the transmission data, and output a result of the judgment as a judgment result.

14. The communication device according to claim 9, further comprising an upper-layer communication protocol circuit configured to judge whether the communication data is the communication data other than the transmission data or the transmission data, and output a result of the judgment as a judgment result.

15. The communication device according to claim 10, further comprising a data judgment circuit configured to judge the judgment result from the upper-layer communication protocol circuit and instruct, when the judgment result indicates that the communication data is the transmission data, the retransmission confirmation data generator to generate the retransmission confirmation data.

16. The communication device according to claim 11, further comprising a data judgment circuit configured to judge the judgment result from the upper-layer communication protocol circuit and instruct, when the judgment result indicates that the communication data is the transmission data, the retransmission confirmation data generator to generate the retransmission confirmation data.

17. The communication device according to claim 12, further comprising a data judgment circuit configured to judge the judgment result from the upper-layer communication protocol circuit and instruct, when the judgment result indicates that the communication data is the transmission data, the retransmission confirmation data generator to generate the retransmission confirmation data.

18. The communication device according to claim 13, further comprising data judgment circuit configured to judge the judgment result from the upper-layer communication protocol circuit and instruct, when the judgment result indicates that the communication data is the transmission data, the retransmission confirmation data generator to generate the retransmission confirmation data.

* * * * *